US007367883B2

(12) United States Patent
Gagnon

(10) Patent No.: US 7,367,883 B2
(45) Date of Patent: May 6, 2008

(54) METHOD OF OPERATING A SELECTION GAME

(75) Inventor: Marie Claude Gagnon, Drummondville (CA)

(73) Assignee: Labtronix Concept Inc., Drummondville (CA)

( * ) Notice: Subject to any disclaimer, the term of this patent is extended or adjusted under 35 U.S.C. 154(b) by 597 days.

(21) Appl. No.: 10/859,453

(22) Filed: May 27, 2004

(65) Prior Publication Data

US 2004/0259623 A1 Dec. 23, 2004

Related U.S. Application Data

(60) Provisional application No. 60/473,258, filed on May 27, 2003.

(51) Int. Cl.
*A63F 13/00* (2006.01)

(52) U.S. Cl. .............................. 463/10; 463/9; 463/13; 463/16; 463/19

(58) Field of Classification Search ............ 463/10-31, 463/41-42; 273/138.1, 271, 272, 275, 292, 273/293
See application file for complete search history.

(56) References Cited

U.S. PATENT DOCUMENTS

| | | | | |
|---|---|---|---|---|
| 5,882,260 | A * | 3/1999 | Marks et al. | 463/13 |
| 6,089,976 | A | 7/2000 | Schneider et al. | |
| 6,159,097 | A | 12/2000 | Gura | |
| 6,159,098 | A | 12/2000 | Slomiany et al. | |
| 6,190,255 | B1 | 2/2001 | Thomas et al. | |
| 6,309,300 | B1 | 10/2001 | Glavich | |
| 6,315,664 | B1 | 11/2001 | Baerlocher et al. | |
| 6,322,309 | B1 | 11/2001 | Thomas et al. | |
| 6,336,860 | B1 * | 1/2002 | Webb | 463/22 |
| 6,346,043 | B1 * | 2/2002 | Colin et al. | 463/17 |
| 6,347,996 | B1 * | 2/2002 | Gilmore et al. | 463/17 |
| 6,533,662 | B2 * | 3/2003 | Soltys et al. | 463/25 |
| 6,550,771 | B1 | 4/2003 | Weaver | |
| 6,561,514 | B2 * | 5/2003 | Myles | 273/292 |
| 6,582,307 | B2 | 6/2003 | Webb | |
| 6,585,591 | B1 | 7/2003 | Baerlocher | |
| 6,599,185 | B1 | 7/2003 | Kaminkow | |
| 6,602,135 | B1 | 8/2003 | Gerrard | |
| 6,602,137 | B2 | 8/2003 | Kaminkow et al. | |
| 6,607,437 | B2 | 8/2003 | Casey | |
| 6,607,438 | B2 | 8/2003 | Baerlocher | |
| 6,609,971 | B2 | 8/2003 | Vancura | |
| 6,609,974 | B2 | 8/2003 | Mead | |
| 6,632,141 | B2 * | 10/2003 | Webb et al. | 463/25 |
| 6,645,074 | B2 | 11/2003 | Thomas et al. | |
| 6,648,754 | B2 | 11/2003 | Baerlocher | |
| 6,648,757 | B1 | 11/2003 | Slomiany et al. | |
| 6,648,759 | B2 | 11/2003 | Vancura | |
| 6,669,559 | B1 * | 12/2003 | Baerlocher et al. | 463/16 |
| 6,676,516 | B2 | 1/2004 | Baerlocher et al. | |
| 6,685,561 | B2 | 2/2004 | Anderson | |

(Continued)

*Primary Examiner*—John M. Hotaling, II
*Assistant Examiner*—Steven J. Hylinski
(74) *Attorney, Agent, or Firm*—Benoît & Co.

(57) ABSTRACT

A method of operating a game comprising displaying a plurality of selectable objects associated with a characteristic. A first player selection and a subsequent player selection are received. The characteristic of the subsequent player selection is compared to the characteristic of the precedent selection or precedent selections to determine, based on said comparison, if the steps of receiving a subsequent player selection and of comparing said characteristics are repeated. A game apparatus and a computer programs are also provided by the present invention.

32 Claims, 12 Drawing Sheets

U.S. PATENT DOCUMENTS

| | | | | |
|---|---|---|---|---|
| 6,688,975 | B2 | 2/2004 | Baerlocher | |
| 6,688,977 | B1 | 2/2004 | Baerlocher | |
| 6,733,386 | B2 | 5/2004 | Cuddy | |
| 6,749,502 | B2 * | 6/2004 | Baerlocher | 463/16 |
| 6,749,504 | B2 | 6/2004 | Hughs-Baird | |
| 6,755,737 | B2 | 6/2004 | Jackson | |
| 6,769,983 | B2 | 8/2004 | Slomiany | |
| 6,780,107 | B2 | 8/2004 | Baerlocher | |
| 6,796,900 | B2 | 9/2004 | Baerlocher | |
| 6,796,902 | B2 | 9/2004 | Baerlocher | |
| 6,802,775 | B2 | 10/2004 | Baerlocher | |
| 6,814,664 | B2 | 11/2004 | Baerlocher | |
| 6,817,943 | B2 | 11/2004 | Gerrard | |
| 6,843,721 | B2 | 1/2005 | Vancura | |
| 6,843,722 | B2 | 1/2005 | Webb | |
| 6,964,416 | B2 * | 11/2005 | McClintic et al. | 273/273 |
| 7,040,983 | B2 * | 5/2006 | Dolloff et al. | 463/16 |
| 7,056,209 | B2 * | 6/2006 | Baerlocher et al. | 463/16 |
| 2001/0054794 | A1 * | 12/2001 | Cole et al. | 273/138.1 |
| 2002/0025844 | A1 * | 2/2002 | Casey et al. | 463/16 |
| 2002/0049084 | A1 * | 4/2002 | Hughs-Baird et al. | 463/20 |
| 2002/0137559 | A1 * | 9/2002 | Baerlocher | 463/16 |
| 2003/0036420 | A1 * | 2/2003 | Baerlocher et al. | 463/16 |
| 2003/0045338 | A1 * | 3/2003 | Dolloff et al. | 463/16 |
| 2003/0064789 | A1 | 4/2003 | Suzuki | |
| 2003/0073481 | A1 | 4/2003 | Bennett | |
| 2003/0104856 | A1 * | 6/2003 | Wolf | 463/16 |
| 2003/0119580 | A1 | 6/2003 | McClintic | |
| 2003/0162578 | A1 | 8/2003 | Baerlocher | |
| 2003/0207710 | A1 | 11/2003 | Rodgers | |
| 2003/0220135 | A1 | 11/2003 | Gauselmann | |
| 2004/0018873 | A1 | 1/2004 | Hughs-Baird | |
| 2004/0018874 | A1 | 1/2004 | Bonney | |
| 2004/0038729 | A1 | 2/2004 | Webb | |
| 2004/0048649 | A1 | 3/2004 | Peterson | |
| 2004/0053669 | A1 | 3/2004 | Gerrard | |
| 2004/0063487 | A1 | 4/2004 | Gerrard | |
| 2004/0082374 | A1 | 4/2004 | Maya | |
| 2004/0082376 | A1 * | 4/2004 | Baerlocher et al. | 463/16 |
| 2004/0152500 | A1 | 8/2004 | Baerlocher | |
| 2004/0162132 | A1 | 8/2004 | Jaffe | |
| 2004/0185930 | A1 | 9/2004 | Thomas et al. | |
| 2006/0252485 | A1 * | 11/2006 | Baerlocher et al. | 463/16 |

* cited by examiner

| Selections | Prize value |
| --- | --- |
| 2 | 5 |
| 3 | 10 |
| 4 | 25 |
| 5 | 75 |
| 6 | 200 |

92

94

Figure 7

160 162 163 164

| Determining selections | Selection applied to | Possible play conditions | | | Applied play conditions |
|---|---|---|---|---|---|
| 1 - 2 | 3 | Red | Even numbers<br>Decreasing<br>Divisible by 2, 3, 6 | - | Red |
| 2 - 3 | 4 | Red | Increasing | - | Increasing |
| 3 - 4 | 5 | - | Increasing | Animals | Animals |
| 4 - 5 | 6 | - | Even numbers<br>Decreasing | Animals | Even numbers |
| 5 - 6 | 7 | Blue | Even numbers<br>Increasing | - | Blue |
| 6 - 7 | 8 | Blue | Decreasing<br>Divisible by 3 | - | Decreasing |
| 7 - 8 | 9 | - | Decreasing | Fruits | Fruits |
| 8 - 9 | 10 | - | Increasing | Fruits | Fruits |
| 9 - 10 | 11 | Green | Decreasing<br>Divisible by 5 | Fruits | Green |
| 10 - 11 | 12 | Green | Decreasing<br>Divisible by 5 | - | Div. by 5 |
| 11 - 12 | 13 | - | Increasing<br>Divisible by 5 | - | Increasing |
| 12 - 13 | 14 | - | Increasing | Objects | Objects |
| 13 - 14 | 15 | - | Prime numbers<br>Odds numbers<br>Decreasing | Objects | Prime numbers |
| 14 - 15 | 16 | - | Prime numbers<br>Odds numbers<br>Decreasing | - | Prime numbers |

Figure 12

METHOD OF OPERATING A SELECTION GAME

CROSS-REFERENCE TO RELATED APPLICATIONS

This application claims priority under 35USC §119(e) of U.S. provisional patent application(s) 60/473,258 filed May $27^{th}$ 2003, the specification of which is hereby incorporated by reference.

TECHNICAL FIELD

The present invention relates to a game offering a selection feature.

BACKGROUND OF THE INVENTION

Gambling has evolved a lot during the last few years, and game manufacturers are always searching for new methods to interest and entertain players. Players are always demanding more features and payout schemes.

Improvements in these kinds of games are desired to enhance the player's interest and entertainment.

SUMMARY OF THE INVENTION

In an embodiment, the present invention provides a method of operating a game comprising displaying a plurality of selectable objects associated with a characteristic. A first player selection and a subsequent player selection are received. The characteristic of the subsequent player selection is compared to the characteristic of the precedent selection or precedent selections to determine, based on said comparison, if the steps of receiving a subsequent player selection and of comparing said characteristics are repeated.

In another embodiment, the present invention provides a gaming apparatus comprising display means to display a plurality of selectable objects associated with a characteristic; input means to receive a first and subsequent player selections; and controller means to compare the characteristic of the subsequent player selection to the characteristic of the precedent selection or precedent selections to determine, based on said comparison, if the input means are authorized to receive a new subsequent player selection.

In yet another embodiment, the present invention provides a computer program embodied on a computer readable medium or in processor-readable memory having codes to display a plurality of selectable objects associated with a characteristic. A first and subsequent player selections are received. The characteristic of the subsequent player selection is compared to the characteristic of the precedent player selection or precedent player selections to determine, based on said comparison, if the steps of receiving a subsequent player selection and of comparing said characteristics are repeated.

In still another embodiment, the present invention provides a computer program carried on an electrical or electromagnetic signal having codes to display a plurality of selectable objects associated with a characteristic. A first and subsequent player selections are received. The characteristic of the subsequent player selection is compared to the characteristic of the precedent player selection or precedent player selections to determine, based on said comparison, if the steps of receiving a subsequent player selection and of comparing said characteristics are repeated.

BRIEF DESCRIPTION OF THE DRAWINGS

Further features and advantages of the present invention will become apparent from the following detailed description, taken in combination with the appended drawings, in which:

FIG. 7 is a pay table of a game applying a partly predetermined play condition in accordance with the present invention;

FIG. 12 is a table of the variable play conditions of the game of FIG. 11.

It will be noted that throughout the appended drawings, like features are identified by like reference numerals.

DETAILED DESCRIPTION OF THE PREFERRED EMBODIMENT

Figure 1:
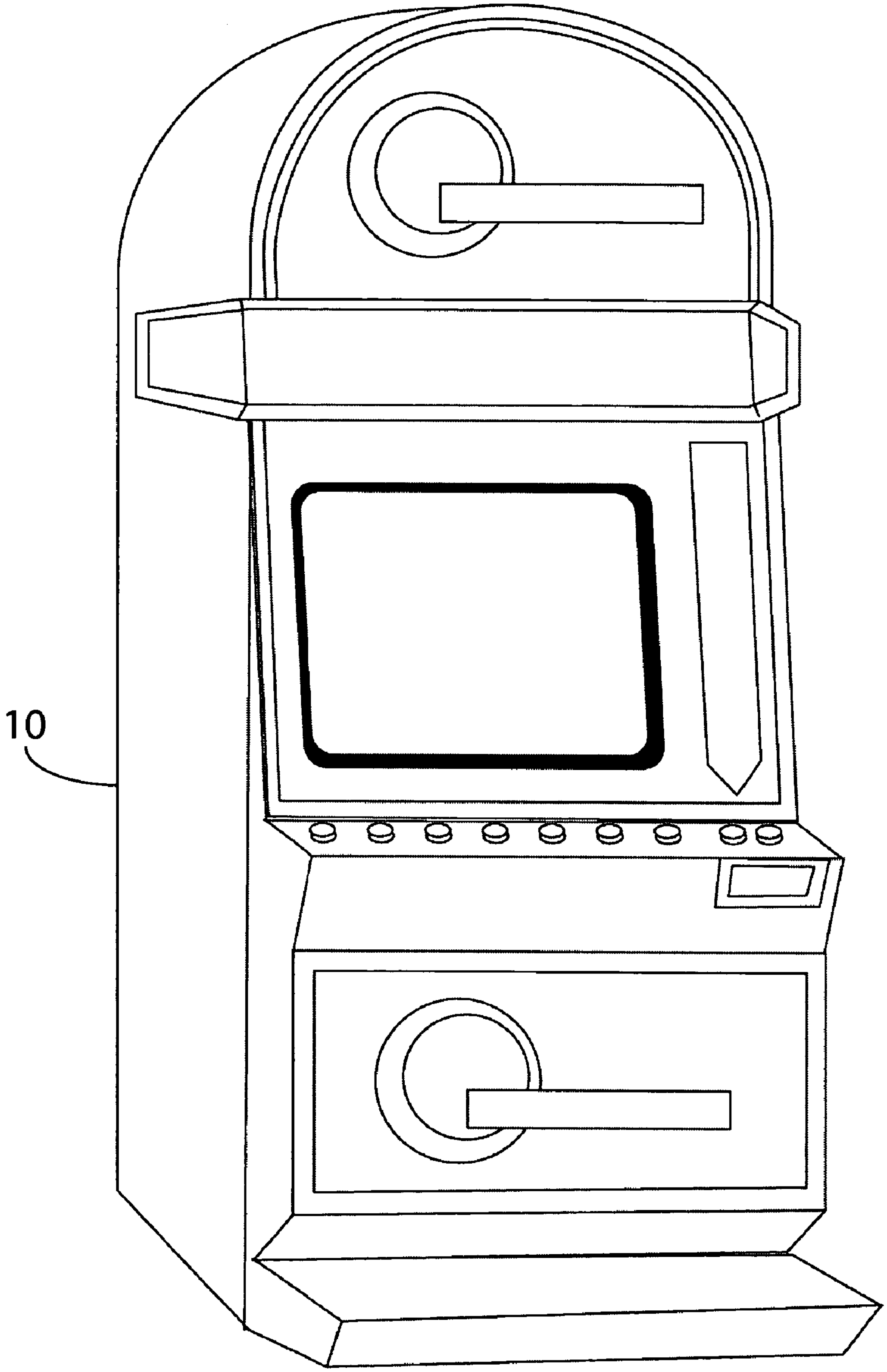
FIG. 1 is a schematic diagram showing a perspective view of a gaming machine suitable for the present invention.
Figure 2:
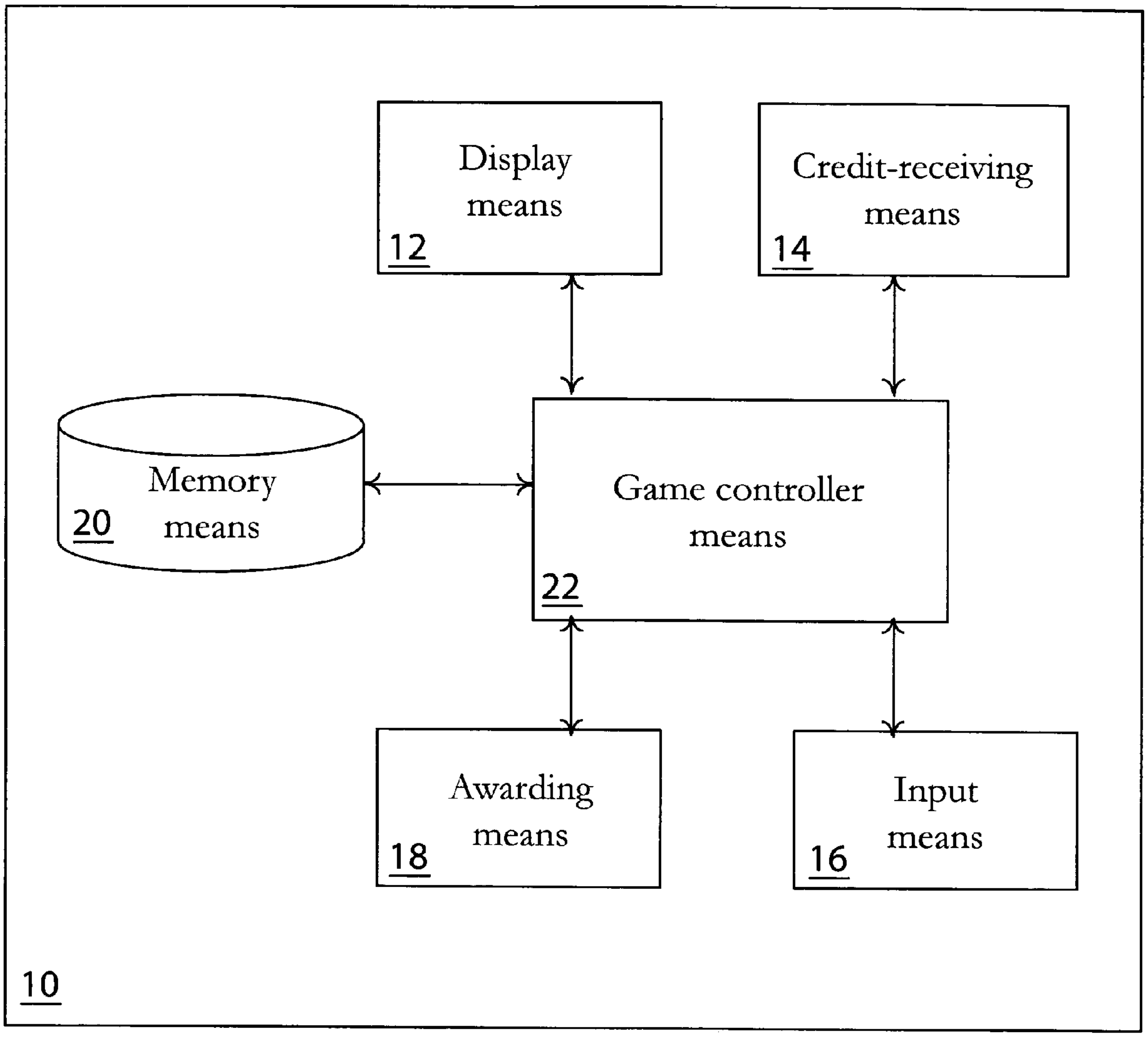
FIG. 2 is a bloc diagram illustrating the components of the gaming machine of FIG. 1.

The present invention is preferably carried out on a gaming machine, as illustrated in FIGS. 1 and 2. Gaming machine 10 comprises display means 12, such as a video screen, a LCD screen or mechanical reels; credit-receiving means 14 such as a card reader, or a coin and/or bill acceptor; input means 16, such as buttons, levers or a touch screen; awarding means 18, such as a ticket printer, a card reader or a hopper; memory means 20 and a game controller means 22.

More precisely, the present invention provides a gaming apparatus 10 comprising display means 12 to display a plurality of selectable objects associated with a characteristic; input means 16 to receive a first and subsequent player selections; and controller means 22 to compare the characteristic of the subsequent player selection to the characteristic of the precedent selection or precedent selections to determine whether the subsequent player selection is successful or not.

The invention may also be applied in a computer program, or at a remote terminal, the game information (not shown) being distributed via a network, such as linked machines or the Internet, or broadcasted using an electrical or electromagnetic signal.

The present invention describes a game offering players a plurality of selectable objects, each object being associated with a characteristic, hidden or not. This characteristic comprises at least one of a value, a color, and a drawing illustrating an identity, allowing the objects to be ranked or to belong in groups or categories. The player selects objects until the play condition is not met.

Different play conditions may apply to different games or even during the play of a single game. The play condition depends, at least in part, on the characteristic borne by the selectable objects. In general, the play condition corresponds to an order or the adherence to a group or category.

The play condition may be simple and use only an order (increasing or decreasing) or category condition. An "ID tag", such as odds or even, prime or non-prime for values and blue or red for colors, identifies the category. To be successful, a selection must result in an object bearing a characteristic belonging to the same category as, or being in order with, the previously selected objects.

In more complex embodiments, the play condition includes a ranking and an "ID tag" or is a compound of different "ID tags". To be successful, the selection must result in an object bearing a characteristic belonging to at least one of the categories identified by the "ID tags" of, or being in order with, the previously selected objects.

Figure 3A:
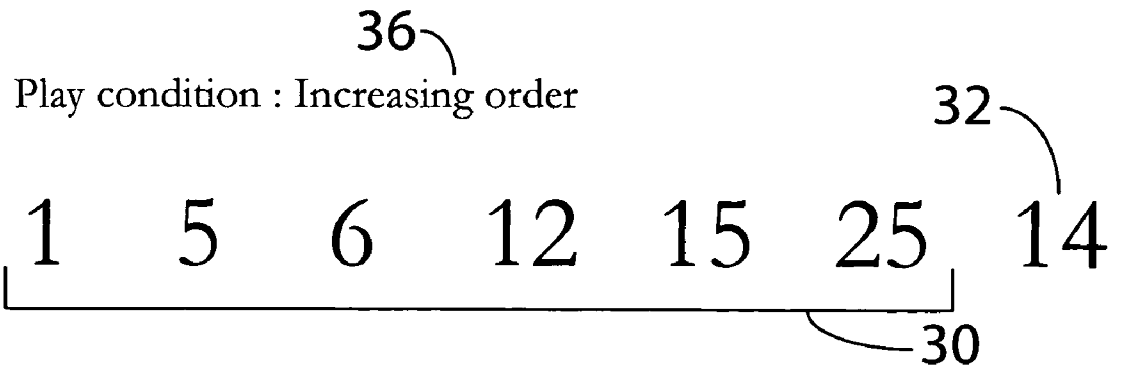
FIGS. 3*a* to 3*c* are illustrations showing a series of selection in accordance with the present invention.
Figure 3B:
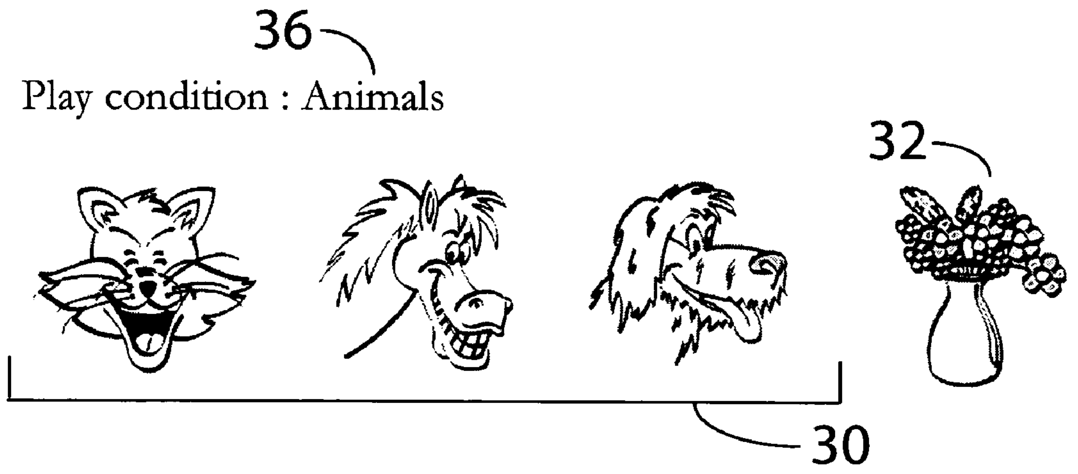
Figure 3C:
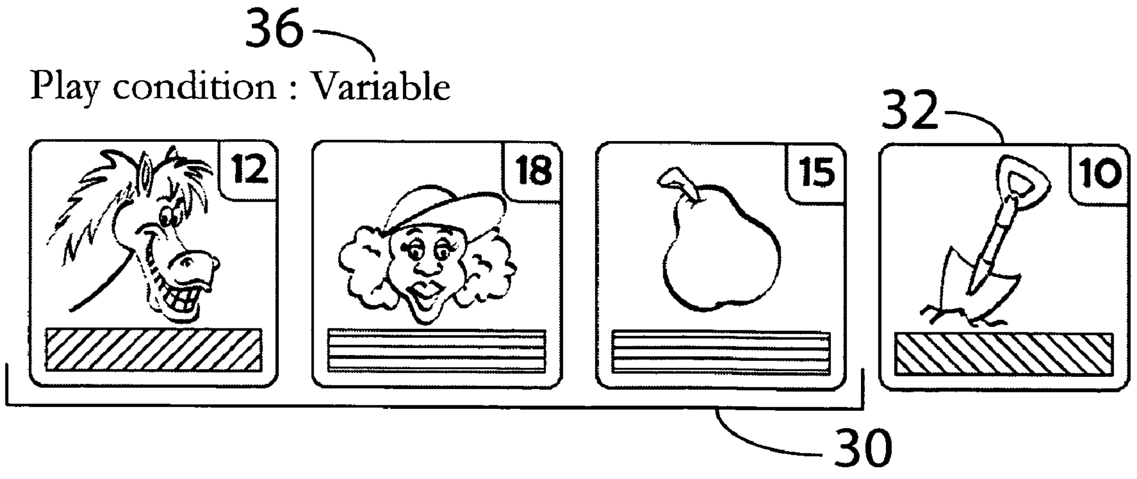

FIG. 3 illustrates series of successful selections 30 ended by an unsuccessful selection 32. For each of these series, the play condition 36, being an order or "ID tag", is identified. FIG. 3*a* illustrates an example wherein the play condition demands that the subsequent selection bears a value higher than the precedent. The play condition of FIG. 3*b* relates to an identity of the characteristic. In this example, the selected object must bear an animal to allow the player to keep on selecting. Finally, FIG. 3*c* illustrates a variable play condition, meaning that the play condition varies and is re-determined at each selection, according to the last two selections. Accordingly, the third selection is successful because one of the common "id tags" of the first and second selections is that both values are divisible by three (3), which is also the case of the value borne by the third selection. On the other hand, none of the common "ID tags" of selection two and three are also common with the fourth selection, rendering it unsuccessful, thus ending the game.

Figure 4:
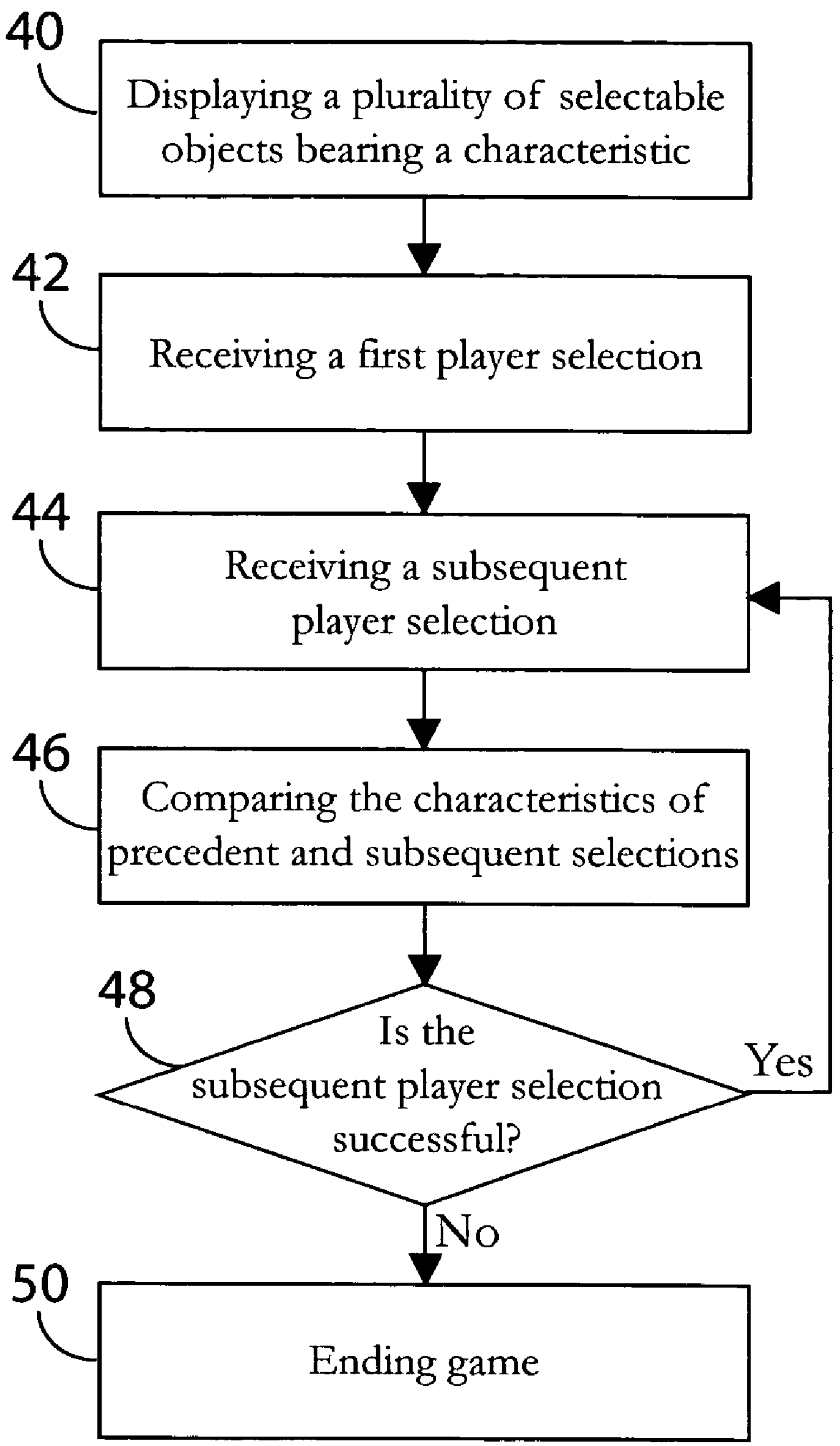
FIG. 4 is a flow chart of a game process in accordance with the present invention.

FIG. 4 illustrates a game process for a simple embodiment. A plurality of selectable objects, each bearing a characteristic, hidden or visible, is displayed 40. A first 42 and a subsequent 44 player selections are received. The characteristic of the subsequent player selection is compared to the characteristic of the precedent player selection according to a play condition 46. It is determined whether or not the subsequent player selection is successful according to the play condition 48. If the player selection is successful, a new subsequent player selection is received 44, if not, the game ends 50.

In a preferred embodiment, the play condition is totally or partly predetermined. An example of a totally predetermined play condition may be that the selected objects must have increasing values, thus a subsequent selection must have a value higher than the precedent selection so the game can continue. On the other hand, a partly predetermined play condition uses the first selection to be complete. For example, if the selectable objects bear hidden colors and numerical values, the play condition may be that to be successful, a selection must result in an object bearing the same color than the first selection. For example, if the selectable objects are divided in two (2) groups—the reds and the blues—and the player selected a blue object as his first selection, to keep on playing, the player must select only blue objects; the game ends when a red object is selected. This embodiment is preferably applied to selectable objects bearing a hidden characteristic. The chances of winning may be affected by this first selection: in the color example, there might be five (5) blue objects and four (4) red objects. If the player selects a blue object as his first selection, he has a higher probability of winning a bigger prize.

Figure 5:
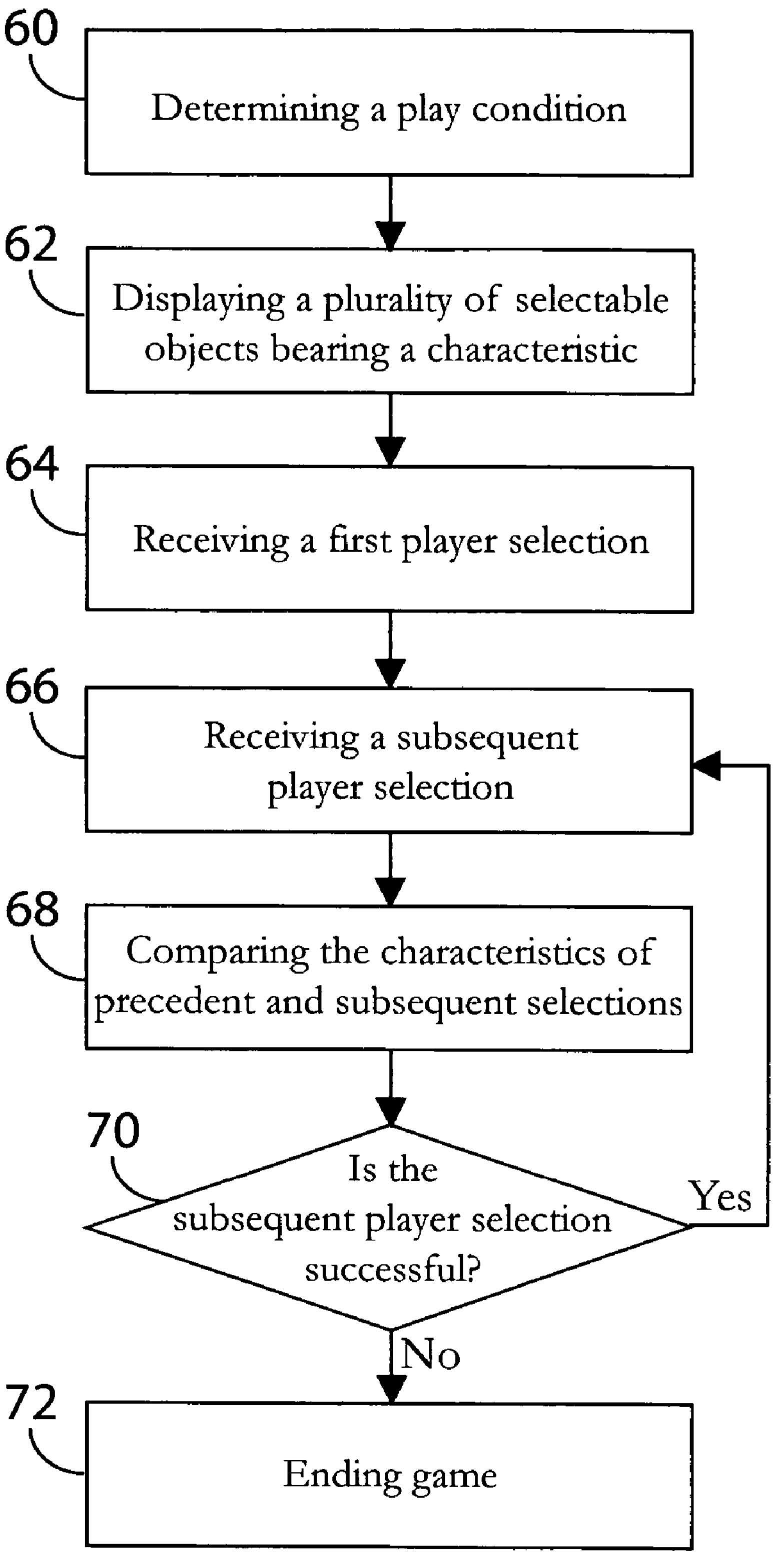
FIG. 5 is a flow chart of a game process applying a totally predetermined play condition in accordance with the present invention.

FIG. 5 illustrates a game process applying a totally predetermined play condition. Before the beginning of the game, a play condition is determined 60. A plurality of selectable objects, each bearing a characteristic, hidden or visible, is displayed 62. A first player selection of a selectable object is received 64, as well as a subsequent player selection 66. The characteristic of the subsequent player selection is compared to the characteristic of the precedent player selection 68 to determine whether or not the subsequent player selection is successful according to the predetermined play condition 70. If the player selection is unsuccessful, the game ends 72, while a new player selection is received 66 if it was successful.

An example of a game applying a predetermined play condition follows. The player is offered ten (10) selectable objects, each bearing a hidden value, ranging from two (2) to twenty-five (25). The predetermined play condition demands that the player must select objects having increasing values. The player selects a first object and reveals a value of ten (10). He must next select (subsequent selection) an object bearing a value higher than ten (10) to keep on playing. The player selects an object bearing a value of twelve (12). The selection is successful and the player makes a new selection. This time, the player selects an object bearing a value of two (2), and thus, his selection is unsuccessful. The game ends and a prize is awarded, based on the selection the player made and possibly a pay table. In this example, the prize corresponds to the sum of the selected object values, awarding twenty-four credits (10+12+2=24).

Figure 6:
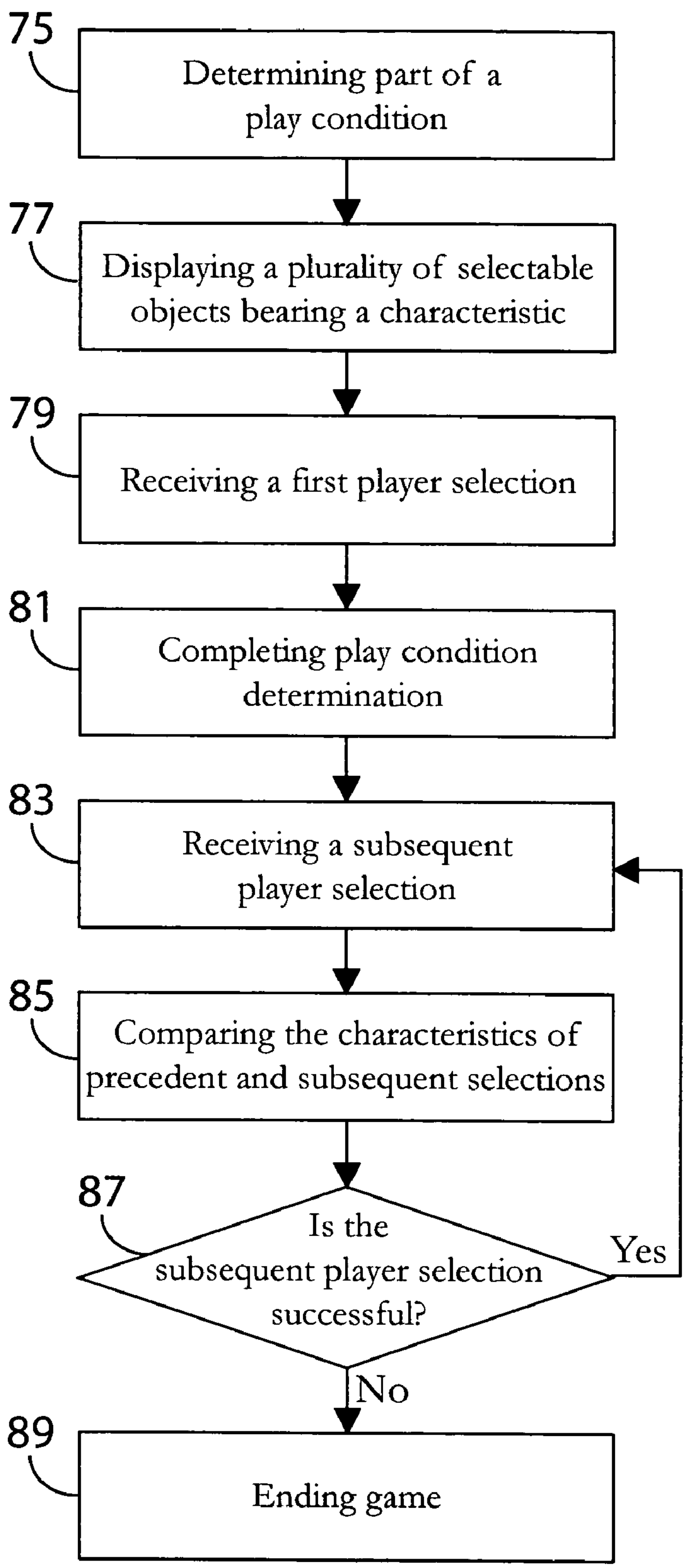
FIG. 6 is a flow chart of a game process applying a partly predetermined play condition in accordance with the present invention.

FIG. 6 is a flow chart illustrating the game process applying a partly predetermined play condition. Before the beginning of the game, a play condition is partly determined 75. A plurality of selectable objects, each bearing a characteristic, hidden or visible, is displayed 77. A first player selection of a selectable object is received 79, and the play condition determination is completed 81. A subsequent player selection is received 83. The characteristic of the subsequent player selection is compared to the characteristic of the precedent player selection 85 to determine whether or not the subsequent player selection is successful according to the play condition 87. If the player selection is unsuccessful, the game ends 89, while a new player selection is received 83 if it was successful.

An example of a game applying a partly predetermined play condition follows. The player is offered ten (10) selectable objects, each bearing a hidden value, ranging from two (2) to twenty-five (25), five (5) of them bearing odd numbers and five (5) bearing even numbers. The predetermined part of the play condition is in the effect that the first selection will indicate whether the play condition will be that the selected objects must bear odd or even numbers. The player selects a first object and reveals a value of ten (10). The play condition is now completely determined and is that the selected objects must bear even numbers. The player selects an object bearing a value of twelve (12). Since twelve (12) is an even number, the selection is successful and the player makes a new selection. This time, the player selects an object bearing a value of two (2), and thus, his selection is successful. The next selection reveals a value of fifteen (15) and is unsuccessful, ending the game. The awarded prize is based on the selection the player made and a pay table as shown in FIG. 7. Since the player made four (4) selections 92 (three successful and one unsuccessful), he is awarded twenty-five (25) credits 94 according to the pay table of FIG. 7.

Figure 8:
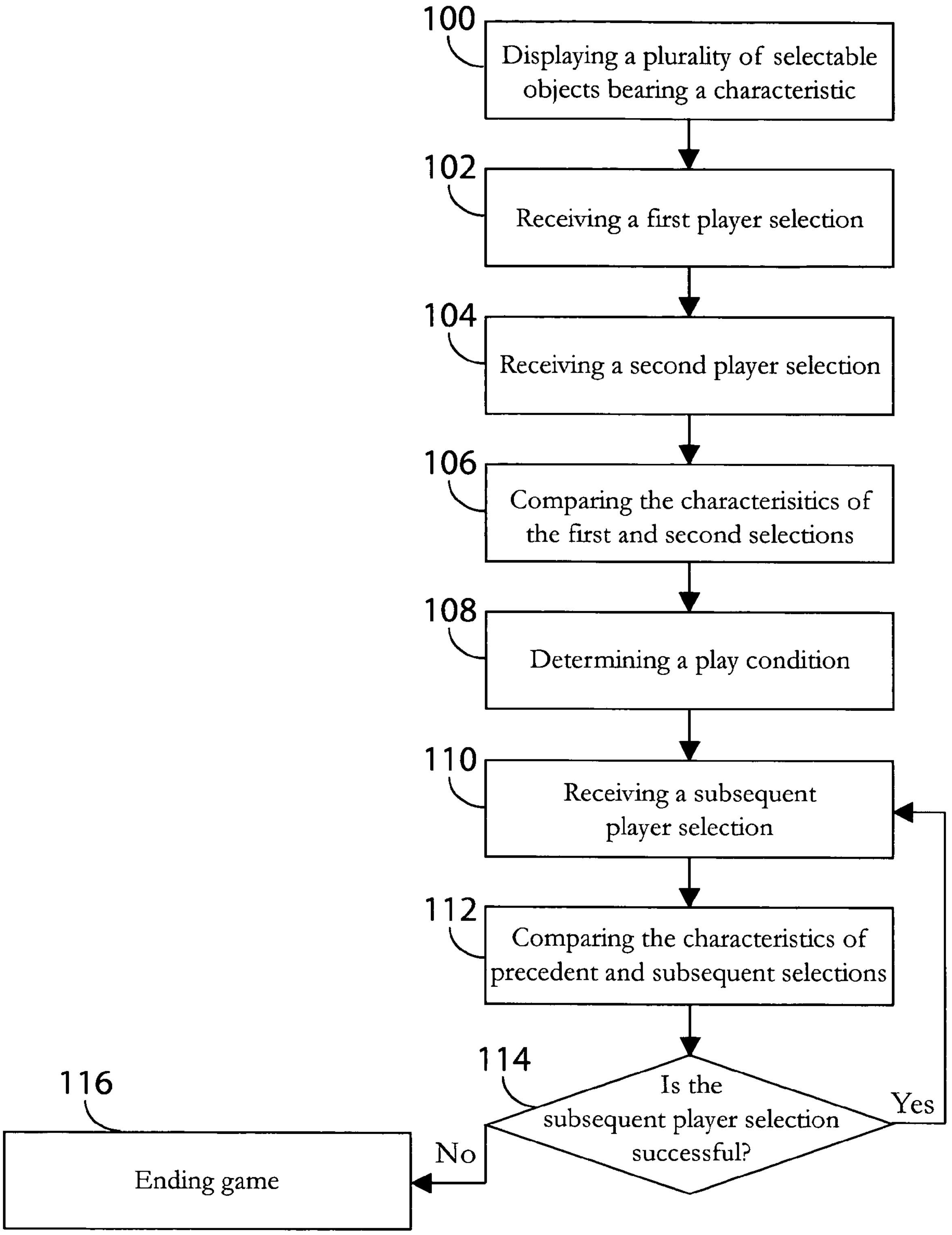
FIG. 8 is a flow chart of a game process applying a play condition determined at the beginning of the game in accordance with the present invention.

In another preferred embodiment, the play condition is determined using the first two selections. The characteristics of the first and second selections are compared to establish a play condition so this second selection is successful. This play condition is then applied to all subsequent selections to determine whether or not they are successful. FIG. 8 illustrates the play process for this embodiment. A plurality of selectable objects, each bearing a characteristic, hidden or visible, is displayed 100. A first player selection of a selectable object is received 102, as well as a second player selection 104. The characteristic of the second player selection is compared to the characteristic of the first player selection 106 and a play condition is determined according to their common parts of this characteristic 108. A subsequent player selection is received 110. The characteristic of the subsequent player selection is compared to the characteristic of the precedent player selection 112 to determine whether or not the subsequent player selection is successful according to the play condition 114. If the player selection is unsuccessful, the game ends 116, while a new player selection is received 110 if it was successful.

Figure 9:
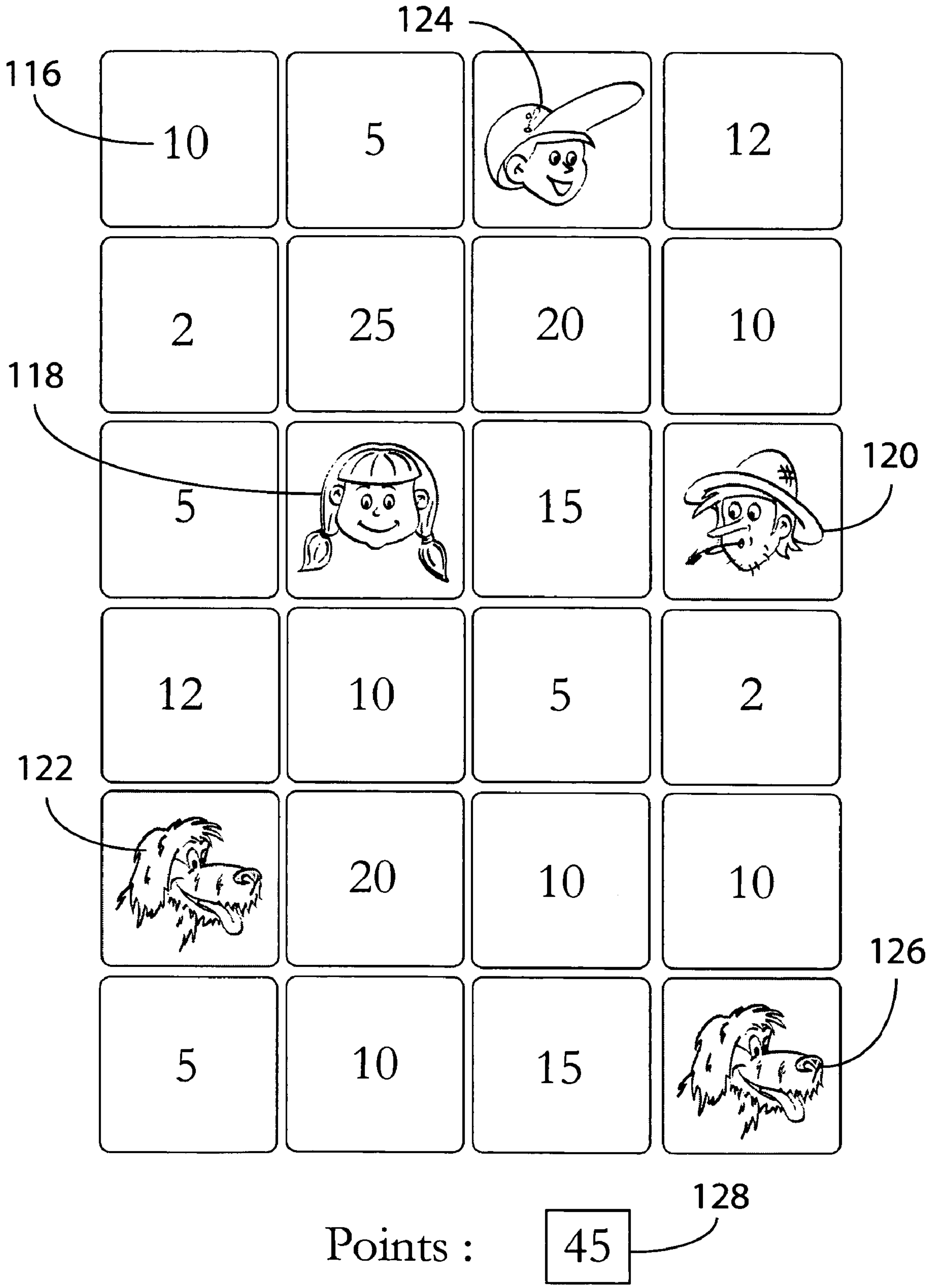
FIG. 9 is a screen shot illustrating an example of a game applying a play condition determined at the beginning of the game.

FIG. 9 illustrates a game applying a play condition determined at the beginning of the game. The player is provided with twenty-four (24) selectable objects, bearing values (visible) 116 and drawings (hidden) 118. The drawings illustrate the members of a family: a father, a mother, a son, a daughter, a dog and a cat. The first two (2) selections determine which kind of selections will be successful for the rest of the game. In this example, since the first 120 and second selections 122 are a father and a dog, to be successful, the next selections must not reveal either a father or a dog. In fact, the player tries to complete the family without any repetition. The third selection 124 is a son, and so on, until the fifth selection 126 upon which the player selected a dog, which ends the game. If the player succeeds in completing a family, he keeps on selecting, trying to complete all four families. In this example, if a prize is awarded, the values of the successful selections are added to determine this prize 128. In the event of the first and second selections resulting in two (2) of the same family members, for example two fathers, the player might receive a bonus prize for finding the four fathers, since the probabilities for getting four successful selections in these conditions are thin compared to getting four members of a family.

In still another embodiment, the play condition is determined with each selection and is used to determine whether or not the subsequent selection is successful. In effect, the first and second selections are used to establish a play condition that is applied to the third selection; the second and third selections establish the play condition applied to the fourth selection and so on. This embodiment is preferably applied with selectable objects bearing a characteristic that is not hidden and thus offers an interesting skill game.

Figure 10:
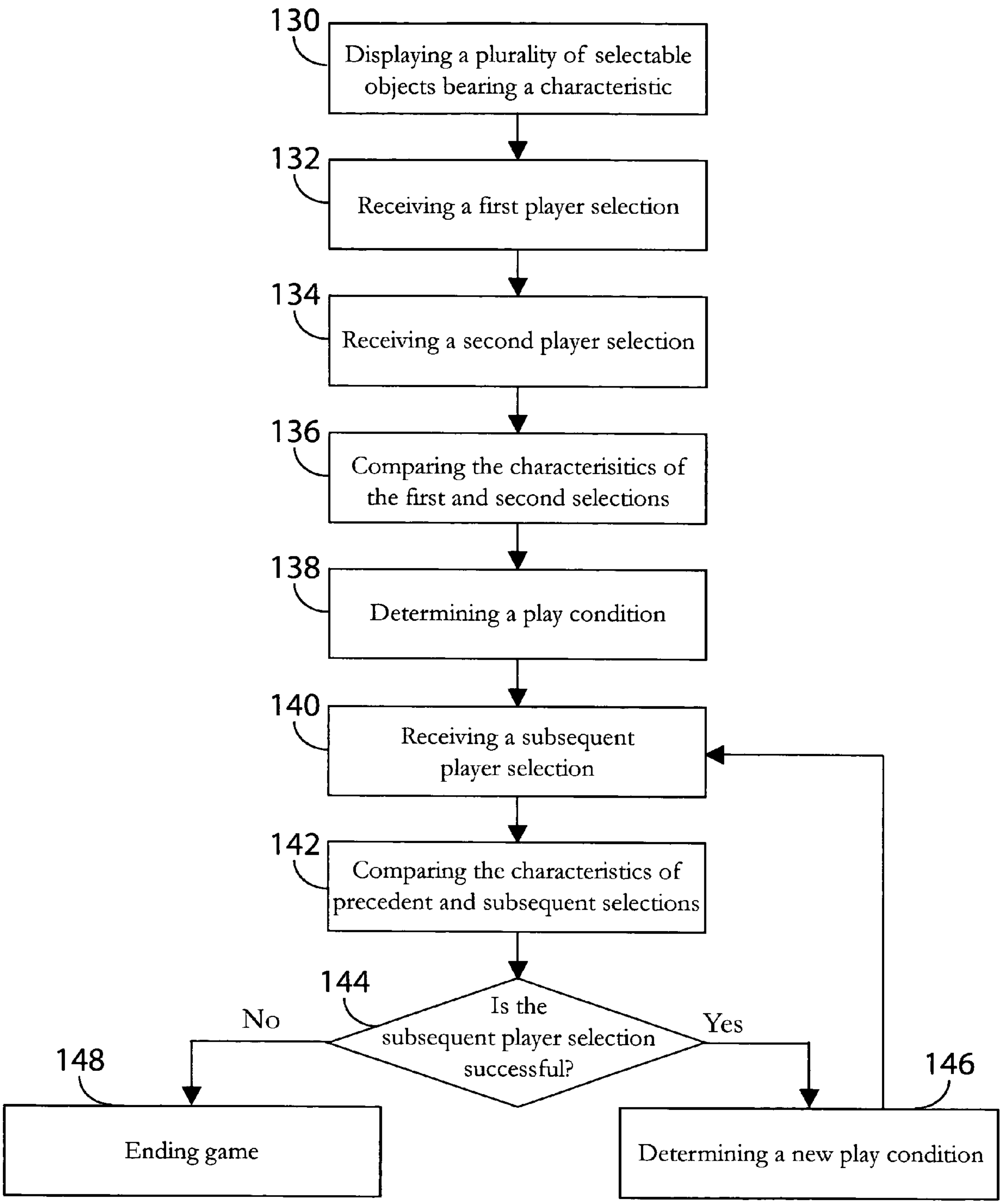
FIG. 10 is a flow chart of a game process applying a variable play condition based on player selections.

FIG. 10 illustrates a game process applying a variable play condition. A plurality of selectable objects, each bearing a characteristic, hidden or visible, is displayed 130. A first player selection of a selectable object is received 132, as well as a second player selection 134. The characteristic of the second player selection is compared to the characteristic of the first player selection 136 and a play condition is determined according to the common orders and/or “ID tags” of their characteristic 138. A subsequent player selection is received 140. The characteristic of the subsequent player selection is compared to the characteristic of the precedent player selection 142 to determine whether or not the subsequent player selection is successful according to the play condition 144. If the player selection is unsuccessful, the game ends 148, while a new play condition is determined 146 and a new player selection is received 140 if it was successful.

Figure 11:
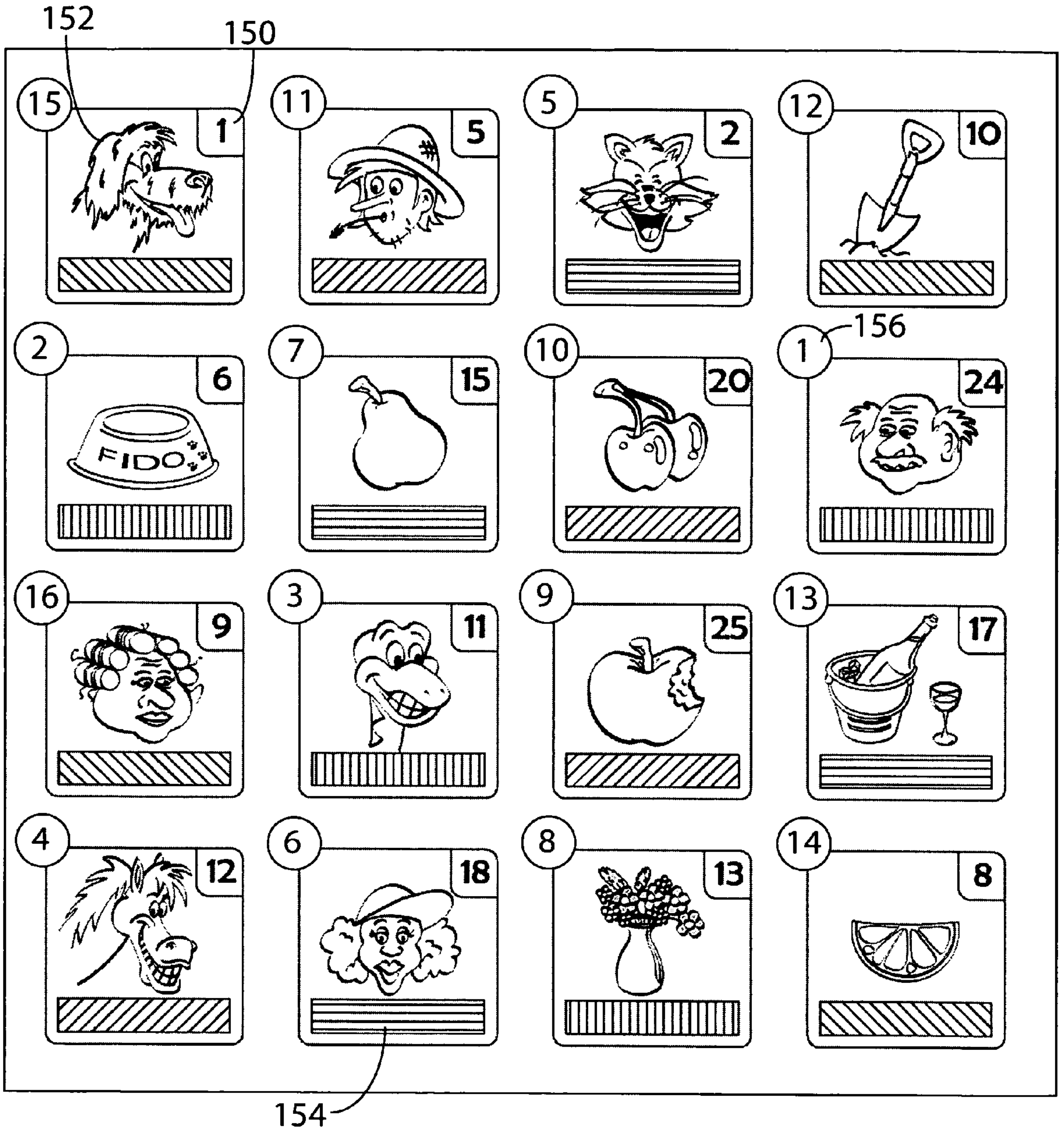
FIG. 11 is a screen shot of a game applying a variable play condition.

FIGS. 11 and 12 illustrate an example of a game applying a variable play condition. In this example, the characteristic is visible and thus the game offered to the player is based on his skill. The player is provided with sixteen (16) selectable objects, each bearing a number 150, a drawing 152 and a color 154 (indicated on the figure by line directions: Red by vertical lines, blue by horizontal lines, green by downward diagonal lines and yellow by upward diagonal lines). The circled numbers indicate the order in which the selections have been made. In this example, the player has been successful in selecting all objects, and thus won the game. FIG. 12 explains the play conditions, possible and applied, of this example. The first column 160 indicates the two selections which characteristics are used to determine the common “ID tags” and thus the possible play conditions, while the second 162 indicates to which selection these possible play conditions are applied. The possible play conditions are listed on the third column 163 and the fourth 164 illustrates which play condition is actually applied to determine if the selection is successful. Each couple of objects have at least two possible play conditions, allowing the player to use any of these possible play conditions to make a successful selection.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiments.

It should be noted that the present invention can be carried out as a method, can be embodied in a system, a computer readable medium, processor-readable memory or an electrical or electromagnetic signal.

The embodiments of the invention described above are intended to be exemplary only. The scope of the invention is therefore intended to be limited solely by the scope of the appended claims.

I We claim:

1. A method of operating a game comprising the steps of:

displaying a plurality of selectable objects, each selectable objects being associated with a characteristic;

receiving a first player selection from said plurality of selectable objects;

receiving a second player selection from said plurality of selectable objects;

establishing a play condition based at least in part on a comparison of the characteristics of said first player selection and said second player selection;

receiving a subsequent player selection from said plurality of selectable objects;

evaluating said subsequent player selection according to said play condition; and when said play condition is fulfilled, repeating the steps of receiving a subsequent player selection and evaluating said characteristic; and ending the game when said play condition is not fulfilled.

2. The method of claim 1, wherein said characteristic of said step of displaying, comprises at least one of (1) a value, (2) a color, and (3) an identity.

3. The method of claim 1, wherein said characteristic of said step of displaying comprises a hidden characteristic.

4. The method of claim 3, wherein the step of establishing a play condition comprises revealing said hidden characteristic.

5. The method of claim 1, wherein the characteristic of the step of establishing a play condition comprises an ID tag defining a group or a category to which said characteristic adheres.

6. The method of claim 1, wherein the step of establishing a play condition comprises determining at least one of (1) an order in said characteristics of said first player selection and said second player selection; (2) an adherence to a group of said characteristics of said first player selection and said second player selection; and (3) an adherence to a category of said characteristics of said first player selection and said second player selection.

7. The method of claim 6, wherein the step of evaluating said subsequent player selection comprises:

determining whether said characteristic of said subsequent player selection (1) follows said order; (2) adheres to said group; or (3) adheres to said category;

declaring said play condition as fulfilled when said determination is positive; and declaring said play condition as not fulfilled when said determination is negative.

8. The method of claim 1, further comprising the step of awarding a prize.

9. The method of claim 8, wherein the step of awarding a prize comprises establishing a prize value based at least in part on a count of said player selections.

10. The method of claim 8, wherein the step of awarding a prize comprises establishing a prize value by adding values associated with the player selections.

11. A method of operating a game comprising the steps of:

displaying a plurality of selectable objects, each selectable objects being associated with at least two characteristics;

receiving a precedent player selection from said plurality of selectable objects;

receiving a subsequent player selection from said plurality of selectable objects;

establishing a play condition based at least in part on a comparison of the characteristics of said precedent player selection and said subsequent player selection;

modifying a status of said precedent player selection to a status of player selection; and modifying a status of said subsequent selection to a status of precedent player selection;

receiving a new subsequent player selection from said plurality of selectable objects;

evaluating said characteristics of said new subsequent player selection according to said play condition; and when said play condition is fulfilled, establishing a new play condition based at least in part on a comparison of the characteristics of said precedent player selection and said new subsequent player selection and repeating the steps of modifying the status of said precedent player selection to a status of player selection and the status of said new subsequent selection to said status of precedent player selection and, receiving a new subsequent player selection and evaluating said characteristic; and ending the game when said play condition is not fulfilled.

12. The method of claim 11, wherein said characteristic of said step of displaying, comprises at least one of (a) a value, (2) a color, and (3) an identity.

13. The method of claim 11, wherein said characteristic of said step of displaying comprises a hidden characteristic.

14. The method of claim 13, wherein the step of establishing a play condition comprises revealing said hidden characteristic.

15. The method of claim 11, wherein the characteristic of the step of establishing a play condition comprises an ID tag defining a group or a category to which said characteristic adheres.

16. The method of claim 11, wherein the step of establishing a play condition comprises determining at least one of (1) an order in said characteristics of said precedent player selection and said subsequent player selection; (2) an adherence to a group of said characteristics of said precedent player selection and said subsequent player selection; and (3) an adherence to a category of said characteristics of said precedent player selection and said subsequent player selection.

17. The method of claim 16, wherein the step of evaluating said subsequent player selection comprises:

determining whether said characteristic of said subsequent player selection (1) follows said order; (2) adheres to said group; or (3) adheres to said category;

declaring said play condition as fulfilled when said determination is positive; and declaring said play condition as not fulfilled when said determination is negative.

18. The method of claim 11, further comprising the step of awarding a prize.

19. The method of claim 18, wherein the step of awarding a prize comprises establishing a prize value based at least in part on a count of said player selections.

20. The method of claim 18, wherein the step of awarding a prize comprises establishing a prize value by adding values associated with the player selections.

21. A method of operating a game comprising the steps of:

displaying a plurality of selectable objects, each selectable objects being associated with a hidden characteristic;

receiving a player selection from said plurality of selectable objects;

establishing one or more play condition based at least in part on said characteristic of said player selection;

receiving a subsequent player selection from said plurality of selectable objects;

evaluating said characteristic of said subsequent player selection according to said play conditions; and when at least one of said one or more play condition is fulfilled, repeating the steps of receiving a subsequent player selection and evaluating said characteristic according to said at least one fulfilled play condition; and ending the game when none of said one or more play condition is fulfilled.

22. The method of claim 21, wherein said characteristic of said step of displaying, comprises at least one of (a) a value, (2) a color, and (3) an identity.

23. The method of claim 21, wherein said characteristic of said step of displaying comprises a hidden characteristic.

24. The method of claim 23, wherein the step of establishing a play condition comprises revealing said hidden characteristic.

25. The method of claim 21, wherein the characteristic of the step of establishing a play condition comprises an ID tag defining a group or a category to which said characteristic adheres.

26. The method of claim 21, wherein the step of establishing a play condition comprises selecting at least one of (1) an order to be followed by said characteristics of said player selection; (2) a group to be adhered to by said characteristics of said player; and (3) a category to be adhered to by said characteristics of said player selection.

27. The method of claim 26, wherein the step of evaluating said player selection comprises:

determining whether said characteristic of said player selection (1) follows said order; (2) adheres to said group; or (3) adheres to said category;

declaring said play condition as fulfilled when said determination is positive; and declaring said play condition as not fulfilled when said determination is negative.

28. The method of claim 21, further comprising the step of awarding a prize.

29. The method of claim 28, wherein the step of awarding a prize comprises establishing a prize value based at least in part on a count of said player selections.

30. The method of claim 28, wherein the step of awarding a prize comprises establishing a prize value by adding values associated with the player selections.

31. A game apparatus comprising:

display means to display a plurality of selectable objects, each selectable objects being associated with a characteristic;

input means to receive player selections; and controller means to establish a play condition based, at least in part, on said characteristic of at least one of said player selections;

evaluate subsequent player selections according to said play condition;

determine from said evaluation whether or not to repeat the steps of receiving subsequent player selections;

repeat the steps of receiving subsequent player selections, and evaluating said subsequent player selections when determination evaluation is positive; and end the game when said determination is negative.

32. A computer program embodied on a computer readable medium or in processor-readable memory, having codes which, when read by a computer, causes said computer to:

display a plurality of selectable objects, each selectable object being associated with a characteristic;

receive player selections;

establish a play condition based, at least in part, on said characteristic of at least one of said player selections;

evaluate subsequent player selections according to said play condition;

determine from said evaluation whether or not to repeat the steps of receiving subsequent player selections, and evaluating said subsequent player selections;

repeat the steps of receiving subsequent player selections, and evaluating said subsequent player selections when determination evaluation is positive; and end the game when said determination is negative.

* * * * *